United States Patent [19]

Woodward et al.

[11] Patent Number: 4,512,199
[45] Date of Patent: Apr. 23, 1985

[54] TRANSDUCER

[75] Inventors: Stewart A. Woodward; Ronald L. Hilty, both of Morrison, Ill.; Donald H. Stoll, North Mankato, Minn.

[73] Assignee: General Electric Company, Fort Wayne, Ind.

[21] Appl. No.: 482,531

[22] Filed: Apr. 6, 1983

[51] Int. Cl.³ .................................................. G01L 9/02
[52] U.S. Cl. ........................................ 73/725; 73/746; 338/42
[58] Field of Search ...................... 73/725, 719, 746; 338/42, 39, 41

[56] References Cited

U.S. PATENT DOCUMENTS

| | | | |
|---|---|---|---|
| 2,286,717 | 6/1942 | Clason | 338/42 |
| 2,790,043 | 4/1957 | Clason | 338/39 |
| 2,846,549 | 8/1958 | Boddy | 338/42 |
| 3,136,970 | 6/1964 | Pegram | 338/42 |
| 3,753,199 | 8/1973 | Rice | 338/42 |
| 3,956,920 | 5/1976 | Kollmeyer | 73/725 |

Primary Examiner—Donald O. Woodiel
Attorney, Agent, or Firm—Joseph E. Papin

[57] ABSTRACT

A transducer for establishing an output voltage proportional to an input fluid pressure supplied thereto. The transducer has a resistor with a voltage selector movable in electrical contacting engagement therewith to establish the output voltage. A piston actuates the voltage selector to its electrical contacting engagement with the resistor to establish the output voltage in response to the input fluid pressure acting on a diaphragm arranged in driving engagement with the piston.

15 Claims, 9 Drawing Figures

TRANSDUCER

FIELD OF THE INVENTION

This invention relates in general to electrical devices and in particular to a transducer for establishing an output voltage proportional to an input fluid pressure supplied thereto.

BACKGROUND OF THE INVENTION

In the past, many different types of transducers were employed in various applications to establish an output voltage which was proportional to a sensed fluid pressure effecting the operation of the transducers. One of these applications was an automotive air conditioning system in which one of the past transducers was employed to control many of the functions of some of the components of such system. One of the disadvantageous or undesirable features of the aforementioned past transducers is believed to be that the size of such past transducers was too large. For instance, due to the aforementioned large size of the past transducers, it was necessary to mount such transducers in the plumbing of the automotive air conditioning system, and it is believed that such plumbing mounting of such past transducers might have resulted in increased labor and/or cost. Thus, it would be desirable to provide a transducer which may be coupled to a compressor of an automotive air conditioning system or that may replace an existing device, such as a high pressure cut-out switch or the like for instance, currently mounted to such compressor with such transducer performing the functions of such existing device as well as other functions.

SUMMARY OF THE INVENTION

Among the several objects of the present invention may be noted the provision of an improved transducer which overcomes the above discussed disadvantageous or undesirable features, as well as others, of the prior art transducer; the provision of such improved transducer of reduced size which may be readily and effectively coupled with a compressor of an automotive air conditioning system; the provision of such improved transducer which may replace a component currently employed in such system and perform the functions of such replaced component as well as other functions; the provision of such improved transducer which is readily and easily calibrated; the provision of such improved transducer having means therein for predeterminately limiting the voltage indicating range thereof; and the provision of such improved transducer which is simple in design, easily assembled and economically manufactured. These as well as other objects and advantageous features of the present invention will be in part apparent and in part pointed out hereinafter.

In general, a transducer in one form of the invention is adapted for connection in circuit relation with a power source and in pressure fluid communication with a fluid pressure source to establish an output voltage proportional to an input fluid pressure supplied from the fluid pressure source. The transducer has a housing, and resistor means in the housing is adapted for connection in the circuit relation across the power source. Voltage selector means adapted for connection in the circuit relation with the power source is movable in the housing in electrical contacting engagement with the resistor means for establishing the output voltage. Means operable in the housing for effecting the movement of the voltage selector means includes piston means for driving engagement with the voltage selector means and movable in the housing between a retractile position and a protractile position. Diaphragm means is adapted for subjection to the supplied input fluid pressure to effect the movement of the piston means from the retractile position toward the protractile position thereof, and at least one spring has a peripheral portion captured in the housing and a generally central resilient portion engaged with the piston means urging the piston means toward the retractile position thereof.

Also in general and in one form of the invention, a transducer is adapted for connection in circuit relation with a power source and in pressure fluid communication with a fluid pressure source to establish an output voltage proportional to an input fluid pressure supplied from the fluid pressure source. The transducer has a housing, and diaphragm means is movably mounted in the housing defining therewith a pair of chambers with one of the chambers being adapted for subjection to the input fluid pressure supplied from the fluid pressure source. Resistor means disposed in the other of the chambers is adapted for connection in the circuit relation across the power source, and voltage selector means adapted for connection in the circuit relation with the power source is movable in the other chamber in electrical contacting engagement with the resistor means for establishing the output voltage. Piston means engaged with said diaphragm means is movable in a part of said housing within the other chamber between a pair of opposite positions for actuating the voltage selector means in response to the fluid pressure of the source acting on the diaphragm means, and the piston means includes means for engagement with the housing part to define at least one of the opposite positions of the piston means. Resilient means for opposing movement of the piston means from the at least one opposite position toward the other of the opposite positions thereof includes a generally circumferential section mounted in association with the housing and a plurality of resilient fingers extending from the circumferential section into engagement with the piston means, respectively.

Further in general, a transducer in one form of the invention is adapted for connection in circuit relation with a power source and in pressure fluid communication with a source of fluid pressure to establish an output voltage proportional to an input fluid pressure supplied from the fluid pressure source. The transducer has a housing, and resistor means in the housing is adapted for connection in the circuit relation with the power source. Voltage selector means adapted for connection in the circuit relation with the power source is movable in the housing in electrical contacting engagement with the resistor means for establishing the output voltage, and means movable in said housing is adapted for subjection to the input fluid pressure supplied from the source thereof for effecting the movement of the voltage selector means. At least one terminal means mounted to the housing is adapted for connection in the circuit relation with the power source, and said at least one terminal means includes an electrical connector section exteriorly of the housing and a supporting arm integral with the electrical connector section and interiorly of the housing with the voltage selector means supported on the supporting arm. Adjusting means is adjustably movable in the housing in engagement with the supporting arm of the at least one terminal and is adapted for displacing the supporting arm and the voltage selector means supported thereon toward a calibration position in which the voltage selector means is in the electrical contacting engagement with the resistor means to effect a preselected minimum value of the output voltage with respect to a preselected minimum value of the input fluid pressure acting on the subjection means.

BRIEF DESCRIPTION OF THE DRAWINGS

Corresponding reference characters indicate corresponding parts throughout the several views of the drawings.

The exemplifications set out herein illustrate the preferred embodiments of the present invention in one form thereof, and such exemplifications are not to be construed as limiting the scope of the invention in any manner.

DETAILED DESCRIPTION OF THE PREFERRED EMBODIMENTS

Figure 1:
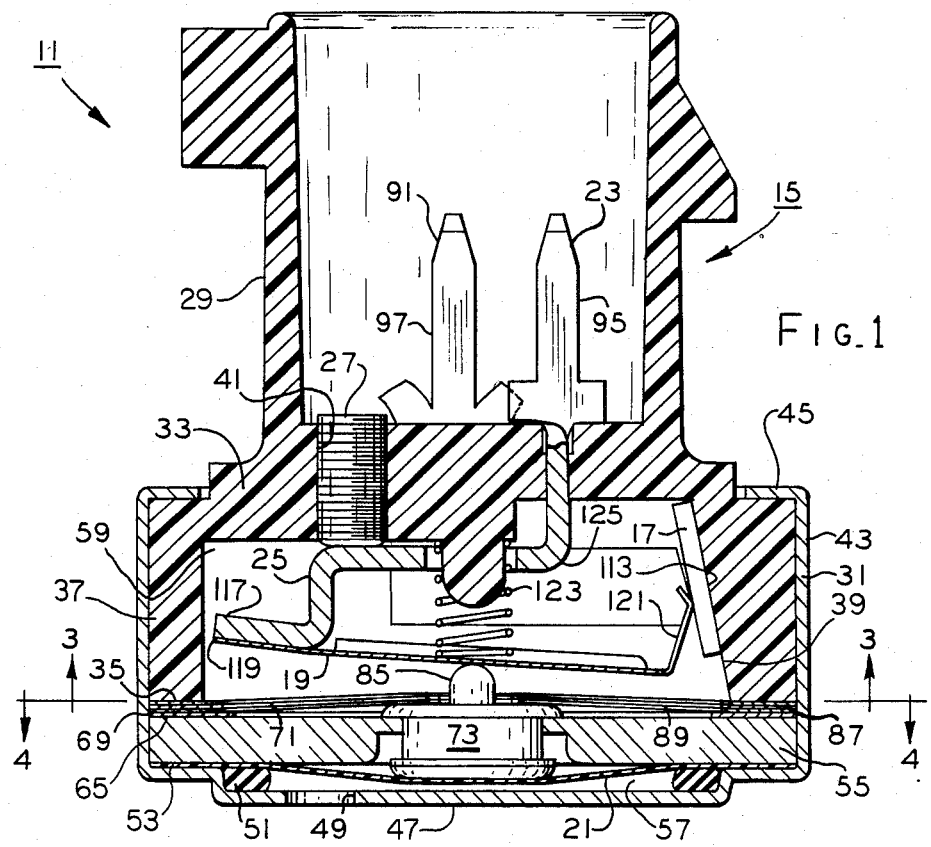
FIG. 1 is a sectional view illustrating in cross section a transducer in one form of the invention.
Figure 3:
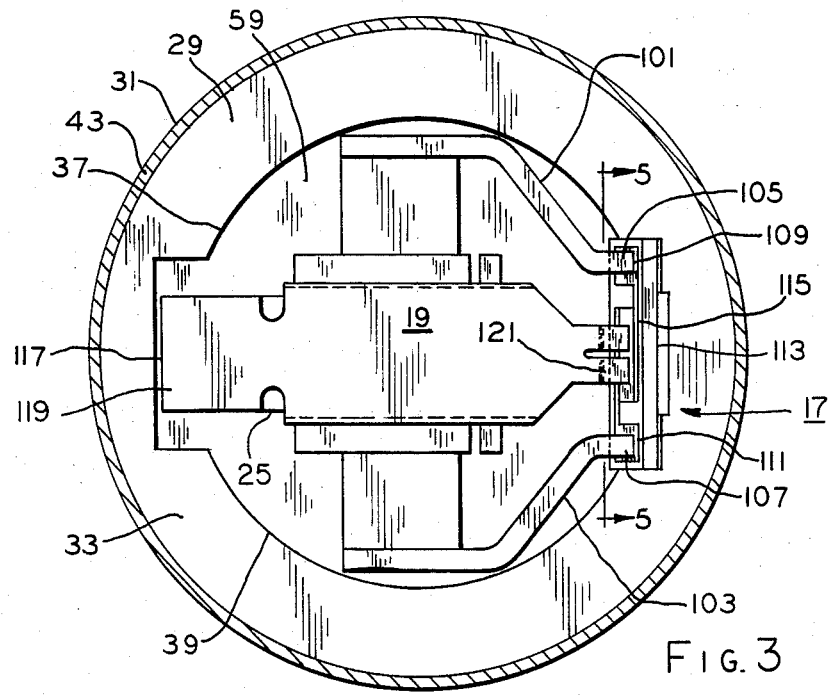
FIGS. 3 and 4 are sectional views taken along lines 3—3 and 4—4 in FIG. 1, respectively.
Figure 6:
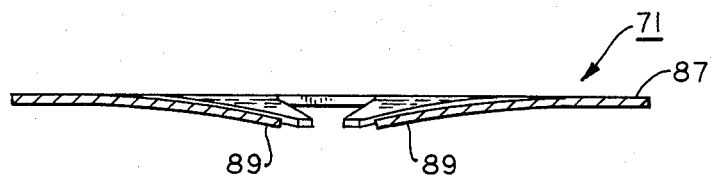
FIG. 6 is a sectional view taken along line 6—6 of FIG. 4 and showing one of the stacked springs in its free form removed from the transducer of FIG. 1.
Figure 7:
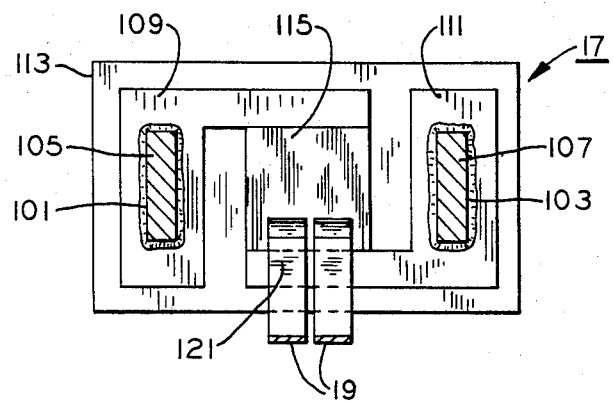
FIG. 7 is a partial sectional view taken along line 5—5 in FIG. 3.
Figure 8:
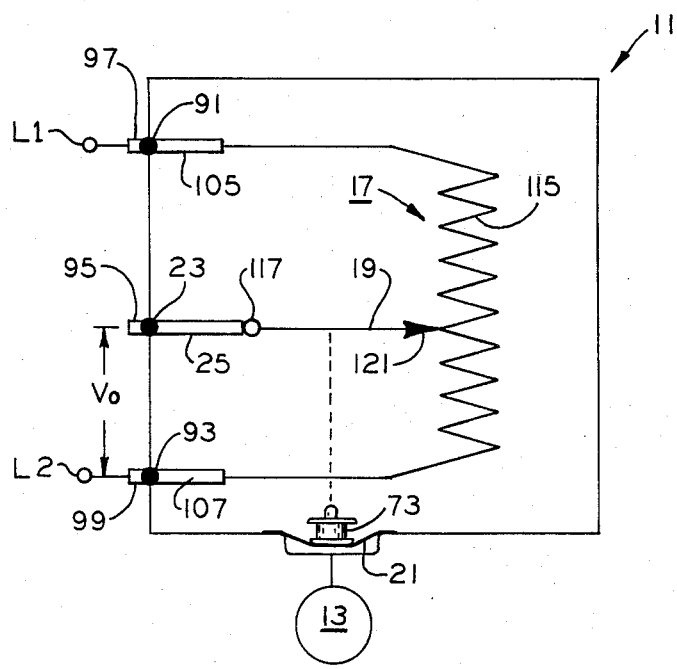
FIG. 8 is a schematic diagram illustrating the electric circuitry of the transducer of FIG. 1.

Referring now to the drawings in general, there is illustrated in one form of the invention a transducer 11 adapted for connection in circuit relation with a pair of power terminals L1, L2 defining a power source and also in pressure fluid communication with a fluid pressure source 13 to establish an output voltage Vo proportional to an input fluid pressure from the fluid pressure source (FIGS. 1 and 8). Of course, it is contemplated that power source L1, L2 may be the opposite poles of a battery or the like for instance and that fluid pressure source may be a compressor of an automotive air conditioning system (not shown) of a type well known to the art within the scope of the invention so as to meet at least some of the objects thereof. Transducer 11 is provided with a housing or casing 15 with a resistor or resistor means 17 therein adapted for connection in circuit relation with power source L1, L2 (FIGS. 1, 3, 7 and 8). A voltage selector means, such as for instance a conductive resilient means or spring element 19 or the like, is movable in housing 15 in a wiping or rubbing type electrical contacting engagement with resistor 17 for establishing output voltage Vo, and means, such as for instance a diaphragm or diaphragm means 21 or the like, is movable in the housing and adapted for subjection to the input fluid pressure supplied from fluid pressure source 13 for effecting the movement of voltage selector means or spring element 19 (FIGS. 1, 3 and 8). A terminal or terminal means 23 mounted to housing 15 is adapted for connection in the circuit relation with power source L1, L2 and includes an integral supporting arm or section 25 interiorly of housing 15 supporting spring element 19 thereon (FIGS. 1 and 8). Adjusting means, such as for instance an adjusting screw 27 or the like, is adjustably movable in housing 15 in engagement with supporting arm 25 of terminal 23 for deflecting or otherwise urging or deforming the supporting arm with spring element 19 supported thereon toward a calibrated or adjusted position in which the spring element is in the wiping electrical contacting engagement with resistor 17 so as to establish a preselected minimum value of output voltage Vo with respect to a preselected minimum value of the input fluid pressure acting on diaphragm 21 (FIGS. 1, 3, 7 and 6).

More particularly and with specific reference to FIG. 1, housing 15 of transducer 11 comprises a pair of housing members, such as for instance a base 29 and a cover 31. Base 29 may be formed of any suitable dielectric material, such as a resin or the like for instance, and has a pair of opposite end walls 33, 35 with a generally annular sidewall 37 integrally interposed therebetween. Opposite end wall 33 and sidewall 37 define a recess 39 therein which intersects with opposite end wall 35 of base 29, and a threaded opening 41 is provided in opposite end wall 33 intersecting with the recess so as to adjustably receive adjusting screw 27. Cover 31 may be formed of any suitable metallic material and has another generally annular sidewall 43 extending in confronting relation about sidewall 37 of base 29. A distal end portion 45 of sidewall 43 is deformed or otherwise bent over into gripping engagement with opposite end wall 33 of base 29 exteriorly thereof so as to secure the base and cover 31 together against displacement. A closure wall 47 on cover 31 is integrally formed with sidewall 43 threof and extends generally across opposite end wall 35 and recess 39 of base 29 in spaced apart relation therewith. A fluid pressure control port, such as for instance a passage or passage means 49, extends through closure wall 47 of cover 31 and is adapted for connection in pressure fluid communication with fluid pressure source 13, as illustrated schematically in FIG. 8. While base 29 and cover 31 are illustrated herein for purposes of disclosure, it is contemplated that various other bases and covers of different shapes, formed of different materials and secured together in different manners may be utilized within the scope of the invention so as to meet at least some of the objects thereof.

Figure 5:
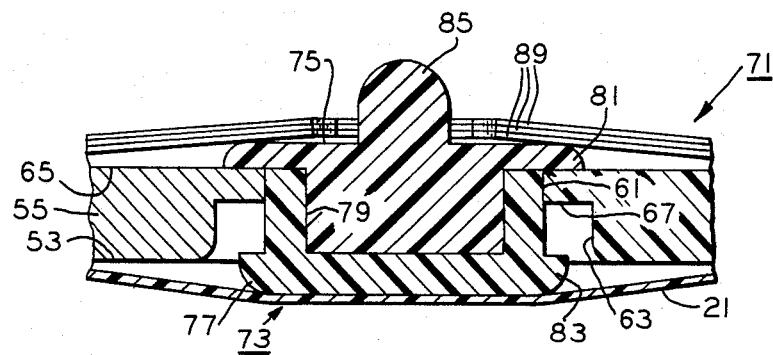
FIG. 5 is an enlarged partial sectional view taken from FIG. 1.

Diaphragm 21, which may be formed of any suitable material, is sealably interposed between an O-ring seal 51 seated against closure wall 47 of cover 31 and a lower face 53 of a generally annular disc member or plate 55 which spans opposite end wall 35 and recess 39 of base 29. In this manner, diaphragm 21 defines with base 29 and cover 31 a pair of chambers 57, 59 therein with chamber 57 being arranged in pressure fluid communication with control port 49 in the cover. As best seen in FIG. 5, a pair of stepped bores 61, 63 extend generally axially through plate 55 intersecting with lower face 53 and an opposite or upper face 65 of the plate, and an annular shoulder or abutment 67 is defined on the plate between the stepped bores so as to be arranged in facing relation with the lower face of the plate. Referring again to FIG. 1, a spacer or washer 69 and resilient means, such as a plurality of stacked springs 71, as discussed in detail hereinafter, are arranged in abutting engagement between opposite end wall 35 of base 29 and upper face 65 of plate 55 adjacent the outer periphery thereof. Since plate 55 is captured between base 29 and cover 31, as discussed above, the plate may, in effect, be viewed as a part of housing 15, and the interior of the housing above diaphragm 21 including recess 39 of body 29 and stepped bores 61, 63 of the plate generally defines chamber 59.

A piston or piston means, indicated generally at 73 in FIG. 5, comprises a pair of piston members 75, 77, and piston member 77 has a recess 79 therein in which piston member 75 is received. Piston 73 is slidably or reciprocally movable in smaller stepped bore 61 of plate 55 and includes a pair of means, such as for instance generally annular upper and lower flanges 81, 83 integral with piston members 75, 77 for motion limiting engagement or abutment with upper face 65 of plate 55 generally about smaller stepped bore 61 therein and shoulder 67 of the plate, respectively. Thus, it may be noted that the engagement of flanges 81, 83 of piston 73 with upper face 65 and shoulder 67 of the plate define a retractile position and a protractile position of the piston so as to predeterminately limit the travel of the piston, i.e., the retractile and protractile movement thereof, respectively, as discussed in greater detail hereinafter. A projection or projection means 85 is provided on piston 73 being integrally formed with piston member 75 so as to extend generally axially thereof into recess 39 of base 29 for driving or operating engagement with spring element 19. While piston member 75 is illustrated herein for purposes of disclosure, it is contemplated that other piston members having different configurations and operations in transducer 11 may be employed within the scope of the invention so as to meet at least some of the objects thereof. For instance, it is contemplated that lower flange 83 may be omitted from piston member 75 with projection 85 having an abutment thereon for engagement with housing 15 within chamber 59 so as to limit the protractile movement of the piston member in the housing. Further, it is also contemplated that a piston member may be utilized in transducer 11 without having means for limiting the protractile movement of such piston member.

Figure 4:
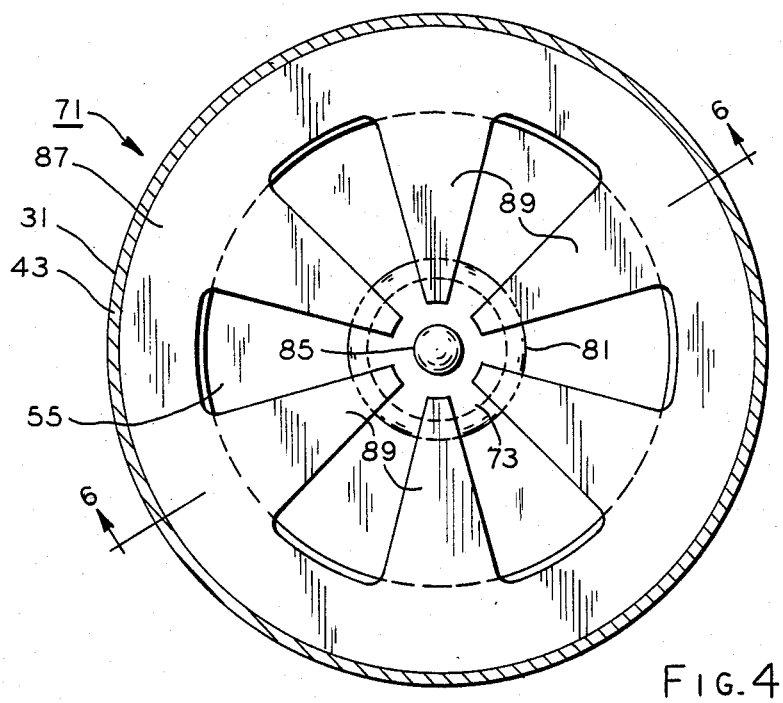

As best seen in FIGS. 1 and 4, each of stacked springs 71 has a generally annular flat peripheral portion or circumferential section 87 captured in housing 15 between opposite end wall 35 of base 29 and upper face 65 of plate 55 and a generally central resilient portion comprising a plurality of resilient spring fingers or cantilevered leafs 89 integrally formed with the spring peripheral portion and extending generally radially inwardly therefrom at least adjacent the upper face of the plate into biasing or abutting engagement with the upper end of piston member 75 about projection 85 thereon. Thus, the combined compressive forces of spring fingers 89 on stacked springs 71 urge piston 73 toward seating engagement on diaphragm 21 and into its retractile position with upper flange 81 on the piston engaging upper face 65 of plate 55 generally about smaller stepped bore 61 therein. It may be noted that in the free position of spring 71, as illustrated in FIG. 6, fingers 89 thereof are resiliently formed or prestressed downwardly generally away from the plane of peripheral portion 87 of the spring. Thus, with stacked springs 71 captured in housing 15 and spring fingers 89 thereof biased against piston 73, as discussed above, the stressing of the spring fingers effects an additive compressive force thereof to bias or preload the piston in its retractile position against movement by diaphragm 21. It is believed that the use of stacked springs 71 may be effective to provide for a greater travel of piston 73, i.e., between its retractile and protractile positions, without causing fracture of the springs. Further, it is also believed that the use of stacked springs 71, not only minimizes space requirements in the design and assembly of transducer 11 but also affords a greater flexibility to attain the desired spring preload and spring gradient upon the assembly of the transducer. Nevertheless, while stacked springs 71 are illustrated herein for purposes of disclosure, it is contemplated that only one spring or a plurality of stacked springs having a different configuration may be utilized within the scope of the invention so as to meet at least some of the objects thereof.

Figure 2:
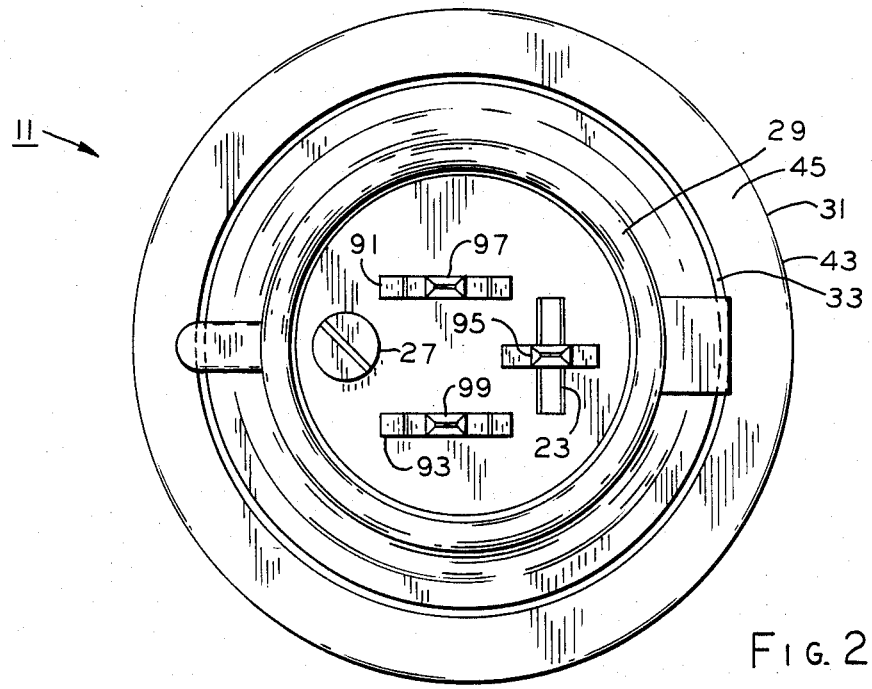
FIG. 2 is a top elevational view of the transducer of FIG. 1.

As shown in FIG. 2, a pair of terminals or terminal means 91, 93 are mounted along with terminal 23 to opposite end wall 33 of base 29 so as to form a cluster or set of terminals. Terminals 23, 91, 93 respectively include electrical connector sections 95, 97, 99 which extend exteriorly of base 29 for connection in circuit relation with power source L1, L2, as best seen in FIG. 8. Electrical connector section 95 of terminal 23 is integrally formed with supporting arm 25 thereof, as best seen in FIG. 1, and terminals 91, 93 include a pair of supporting sections 101, 103 integral with electrical connector sections 97, 99 and which extend into recess 39 of base 29 for connection in circuit relation across resistor 17, as best seen in FIGS. 3 and 7. A pair of connection ends or end portions 105, 107 on supporting sections 101, 103 of terminals 97, 99 are interconnected mechanically and electrically by suitable means, such as soldering or welding for instance, to a pair of metallic connection pads 109, 111 mounted by suitable means well known in the art to a substrate 113 of resistor 17 within recess 39 of base 29. Substrate 113 may be formed of any suitable dielectric material, such as a ceramic material or the like for instance, and a resistance element 115, such as a pad of thick film resistance material or the like for instance, is disposed or otherwise adhered to the substrate by suitable means well known to the art. Resistance element 115 is electrically interconnected in circuit relation between connection pads 109, 111 on substrate 113, and the substrate is supported on supporting sections 101, 103 or terminals 91, 93 at least adjacent sidewall 37 of base 29 within recess 39 thereof. Thus, resistor 17 comprises substrate 113, resistance element 115 and connection pads 109, 111.

Supporting arm 25 of terminal 23 is arranged so as to extend at least in part generally between supporting sections 101, 103 of terminals 91, 93 within recess 39 of base 29, and a free end portion or pivotal end 117 of the supporting arm is arranged so as to be generally diametrically spaced from substrate 113 in the recess while also being spaced adjacent adjusting screw 27 within the recess, as best seen in FIGS. 1 and 3. Spring element 19 has a pivoted end 119 electrically and mechanically connected by suitable means, such as welding, riveting, crimping or the like for instance, to free end portion 117 of supporting arm 25 on terminal 23, and another end portion or contact end 121 of the spring element opposite the pivoted end portion thereof defines a contact or contact means arranged in the aforementioned wiping or rubbing type electrical contacting engagement with resistance element 115 on substrate 113 of resistor 17 within recess 39 of base 29. Between opposite pivoted end 119 and contact end 121 of spring element 19, the spring element is arranged in driven or abutting engagement with the free end of projection 85 on piston 73. A return spring 123 may be biased between opposite end wall 35 of base 29 and spring element 19 if desired. Spring element 19 may be formed of any suitable material, such as a beryllium copper or the like for instance, having desired resilient and electrical conductive properties. While resistor 17 and spring element 19 are illustrated herein for purposes of disclosure, it is contemplated that other types of resistors and spring elements having various other configurations and formed of different materials may be utilized within the scope of the invention so as to meet at least some of the objects thereof. Albeit not shown for purposes of drawing simplicity, cover 31 of transducer 11 may be captured or otherwise secured in a means for seating or receiving it provided in the housing of compressor 13 which is illustrated schematically in FIG. 8.

It is, of course, necessary to calibrate transducer 11 before it is associated with compressor 13 in an automotive type air conditioning system (not shown). To effect the calibration of transducer 11, the aforementioned preselected minimum value of input fluid pressure is supplied from a calibration source thereof (not shown) through control port 49 of housing 15 into fluid pressure chamber 57 thereof. This supplied input fluid pressure acts on the effective area of diaphragm 21 within fluid pressure chamber 57 to establish an actuating force deflecting the diaphragm and conjointly moving piston 73 upwardly in smaller stepped bore 61 of plate 55 from the retractile position of the piston toward a protractile position thereof against the additive compressive forces of stacked springs 71, spring element 19 and return spring 123. The upward movement of piston 73 is translated through projection 85 of the piston to spring element 19, and in response thereto, the spring element is pivoted about its pivoted end 119 supported on free end 117 of supporting arm 25 on terminal 23. Upon this pivotal movement of spring element 19, contact end 121 thereof is moved to a position in contacting engagement with resistance element 115 establishing an output voltage Vo across terminal 23 and one of terminals 91, 93. Of course, the input voltage may be supplied from a calibration power source or battery (not shown) to transducer 11 and is applied across terminals 91, 93 thereof. Assuming resistance element 115 has a predetermined voltage range, say from about 2.5 v. to about 7.5 v. for instance, it is desirable to have contact end 121 of spring element 19 in a calibrated position in electrical contacting engagement with the resistance element so as to indicate the low end of the voltage range thereof, i.e., about 2.5 v., when the preselected minimum value of the input fluid pressure is established so as to act on diaphragm 21 to effect the operation of the spring element, as previously mentioned. Therefore, in order to effect the disposition of contact end 121 of spring element 19 in the calibrated position thereof, a manual calibrating or adjusting force is applied or exerted on adjusting screw 21 by means of a tool, such as a screw driver or the like, to drivingly engage the adjusting screw with supporting arm 25 of terminal 23 at least generally adjacent free end portion 117 of the supporting arm. When the manual or calibrating force is transmitted from adjusting screw 21 to supporting arm 25 of terminal 23, the supporting arm is deformed or deflected generally about a deformation or deflection section thereof, such as a bent or reduced portion thereof for instance as indicated at 125, and upon such deformation or deflection of the supporting arm about the deformation section thereof, free end portion 117 of the supporting arm and spring element 19 are conjointly pivoted with respect to resistance element 115 of resistor 17 until contact end 121 of the spring element is predeterminately located or moved into its calibrated position in electrical contacting engagement with the resistance element. When contact end 121 of spring element is in its calibrated position, the output voltage Vo of transducer 11 will be generally at the desired preselected minimum value, i.e., approximately 2.5 v., when the input fluid pressure at control port 49 is at the preselected minimum value thereof. When transducer 11 is so calibrated, as discussed above, the manual calibration force on adjusting screw 21 is eliminated, and the input fluid pressure is exhausted from fluid pressure chamber 57 through control port 49. Upon the exhaustion of the input fluid pressure, the actuating force effected by diaphragm 21 is, of course, eliminated, and the additive compressive forces of stacked springs 71, spring element 19, and return spring 123 return the spring element, piston 73 and the diaphragm to the respective at-rest positions thereof. Of course, upon this retractile movement of piston 73 to its at-rest or retractile position, upper flange 81 of the piston is reengaged with upper face 65 of plate 55 about smaller stepped bore 61 therein. While the adjusting cooperation of adjusting screw 21 and supporting arm 23 of terminal 25 are illustrated herein to effect the calibration of transducer 11 for purposes of disclosure, it is contemplated that other adjusting or calibration effecting means may be employed to calibrate the transducer within the scope of the invention so as to meet at least some of the objects thereof.

Subsequent to the calibration of transducer 11, the transducer may be connected in an automotive type air conditioning system (not shown) with terminals 91, 93 in circuit relation with power terminals L1, L2 and with control port 49 in pressure fluid communication with compressor 13, as previously mentioned and as illustrated schematically in FIG. 8; and when so connected with the power source and the compressor, the transducer is operable to select a value of output voltage Vo which is proportional to a value of the input fluid pressure supplied from the compressor to the control port of the transducer. As previously described, the input fluid pressure at control port 49 acts on the effective area of diaphragm 21 in fluid pressure chamber 57 to establish the actuating or driving force to conjointly effect the protractile movement of piston 73 from its retractile position toward the protractile position thereof. Upon its protractile movement, piston 73 pivotally moves or drives spring element 19 about its pivoted end 117 so as to move its contact end 121 across resistance element 115 in the wiping electrical contacting engagement therewith toward a contact position wherein the value of the output voltage Vo across terminals 23, 93 of transducer 11 is proportional to the value of the input fluid pressure at control port 49 acting on diaphragm 21. Of course, as the value of the input fluid pressure at control port 49 is changed or fluctuates in accordance with the output of compressor 13, the actuating force is correspondingly changed to effect the actuation of spring element 19 to a contact position with respect to resistance element 115 in order to maintain the output voltage Vo proportional with the input fluid pressure at control port 49. In the event of the elimination of the input fluid pressure at control port 49, the actuating force is eliminated, and the additive compressive forces of stacked springs 71, spring element 19 and return spring 123 effect the return of the spring element, piston 73 and diaphragm 21 to their respective at-rest positions, as previously discussed. Thus, diaphragm 21 and piston 73 comprise a means operable in housing 15 of transducer 11 for effecting the movement or voltage selecting operation of spring element 19.

Figure 9:
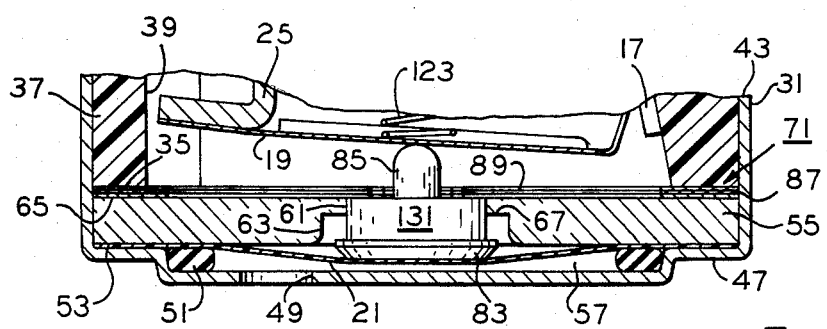
FIG. 9 is a partial sectional view illustrating an alternative transducer in one form of the invention.

In FIG. 9, an alternative piston or piston means 131 is shown having generally the same component parts and operable in transducer 11 generally in the same manner as the previously described piston 73 with the exceptions discussed hereinafter.

Piston 131 has a unitary construction with only lower flange 83 and projection 85 integrally formed thereon. Piston 131 is urged toward its retractile position in seated engagement against diaphragm 31 by the compressive forces of spring fingers 89 biased against the upper end of the piston. When input fluid pressure is established at control port 49 of transducer 11, the established fluid pressure acts on the effective area of diaphragm 21 in fluid pressure chamber 57 deflecting the diaphragm and conjointly effecting protractile movement of piston 131 upwardly from its retractile position toward its protractile position against the additive compressive forces of stacked springs 71, spring element 19 and returns spring 123 thereby to effect the voltage selecting operation of the spring element, as discussed hereinabove. Of course, lower flange 83 on piston 131 is adapted for engagement with shoulder 67 on plate 55 thereby to predeterminately limit the protractile movement or travel of the piston in smaller stepped bore 61 of the plate. When the input fluid pressure at control port 49 of transducer 11 is eliminated, piston 131 is returned or retractively moved to its retractile or at-rest position by the additive compressive forces of stacked springs 71, spring element 19 and return spring 123.

From the foregoing, it is now apparent that an improved transducer 11 is presented meeting at least the objects set out hereinbefore, and it is contemplated that changes as to the precise arrangements, shapes, details and connections of the components disclosed herein by way of illustration as being merely representative may be made by those having ordinary skill in the art without departing from the spirit of the invention or the scope thereof as set out in the claims which follow.

What we claim as new and desire to secure by Letters Patent of the United States is:

1. A transducer adapted for connection in circuit relation with a power source and in pressure fluid communication with a fluid pressure source to establish an output voltage proportional to an input fluid pressure supplied from the fluid pressure source, the transducer comprising:

a pair of housing members secured together against displacement, one of said housing members including a pair of opposite end walls with a sidewall interposed therebetween, a recess intersecting with one of said end walls, and a threaded opening in the other of said end walls intersecting with said recess, the other of said housing members including another sidewall extending generally in confronting relation about said first named sidewall, a closure wall integral with said another sidewall and extending generally across said one end wall and said recess, and at least one passage means in said closure wall adapted for connection in the pressure fluid communication with the fluid pressure source;

resistor means within said recess and adapted for mounting therein at least adjacent said first named sidewall;

a set of terminal means mounted to said other end wall and adapted for connection in the circuit relation with the power source, a pair of said terminal means including a pair of means within said recess for electrical connection across said resistor means, respectively, and another one of said terminal means including a deformable supporting arm within said recess and having a free end portion spaced from said resistor means generally adjacent said threaded opening;

resilient means mounted to said free end portion of said deformable supporting arm within said recess and in pivotally movable electrical contacting engagement with said resistor means between the connection therewith of said electrical connection means of said terminal means pair to establish the output voltage;

a plate extending across said recess and including a pair of stepped bores extending therethrough, and a shoulder defined between said stepped bore;

diaphragm means sealably interposed between said plate and said closure wall and adapted for displacement in response to the input fluid pressure acting thereon and established at said passage means when it is connected in the pressure fluid communication with the fluid pressure source;

piston means adapted for movement in the smaller of said stepped bores in response to the input fluid pressure displacement of said diaphragm means, said piston means including means for engagement with said shoulder to limit the movement of said piston means in said smaller stepped bore, and projection means on said piston extending into said recess for pivotally moving said resilient means about said free end portion of said deformable supporting arm to alter the electrical connection engagement of said resilient means with said resistor means and thereby establish the output voltage upon the movement of said piston means by said diaphragm means in response to the input fluid pressure acting thereon;

at least one spring including a peripheral portion interposed between said plate and said one end wall, and a plurality of resilient fingers extending from said peripheral portion into overlaying relation with said piston means generally about said projection means thereof and urging said piston means against movement by said diaphragm means, respectively; and an adjusting screw received in said threaded opening and extending into said recess into engagement with said free end portion on said deformable arm of said another one terminal means, said adjusting screw being adjustably movable in response to a manual adjusting force exerted thereon to effect the deformation of said deformable supporting arm and adjustably move said resilient means toward a calibrated position in its electrical connection engagement with said resistor means thereby to define a predetermined output voltage correlative with a predetermined input fluid pressure at said passage means.

2. A transducer adapted for connection in circuit relation with a power source and in pressure fluid communication with a fluid pressure source to establish an output voltage proportional to an input fluid pressure supplied from the fluid pressure source, the transducer comprising:

a housing;

resistor means in said housing and adapted for connection in the circuit relation across the power source;

voltage selector means adapted for connection in the circuit relation with the power source and movable in said housing in electrical contacting engagement with said resistor means for establishing the output voltage;

means operable in said housing for effecting the movement of said voltage selector means and including piston means for driving engagement with said voltage selector means and movable in said housing between a retractile position and a protractile position, diaphragm means adapted for subjection to the supplied input fluid pressure to effect the movement of said piston means from the retractile position toward the protractile position thereof, and at least one spring having a peripheral portion captured in said housing and a generally central resilient portion engaged with said piston means urging said piston means toward the retractile position thereof.

3. A transducer as set forth in claim 2 wherein said piston means includes means for abutment with a part of said housing to define at least one of the protractile and retractile positions of said piston means.

4. A transducer as set forth in claim 2 wherein said piston means includes a pair of flange means spaced apart from each other for abutment with a part of said housing to respectively define the protractile and retractile positions of said piston means.

5. A transducer as set forth in claim 2 wherein said housing includes a plate extending generally coextensively with said diaphragm means at least adjacent thereto, a pair of stepped bores in said plate defining a shoulder therebetween, said piston means being slidable in the smaller of said stepped bores and including a pair of opposite end portions with one of said opposite end portions being seated against said diaphragm means and the other of said end portions being engaged with said generally central resilient portion of said at least one spring, and flange means on said piston means for abutment with said shoulder to define the protractile position of said piston means.

6. A transducer as set forth in claim 5 wherein said piston means further includes another flange means spaced from said first named flange means for abutment with a portion of said plate about said smaller stepped bore and in opposite facing relation with said shoulder to define the retractile position of said piston means.

7. A transducer adapted for connection in circuit relation with a power source and in pressure fluid communication with a fluid pressure source to establish an output voltage proportional to an input fluid pressure supplied from the fluid pressure source, the transducer comprising:

a housing;

diaphragm means movably mounted in said housing and defining therewith a pair of chambers, one of said chambers being adapted for subjection to the input fluid pressure supplied from the fluid pressure source;

resistor means disposed in the other of said chambers and adapted for connection in the circuit relation across the power source;

voltage selector means adapted for connection in the circuit relation with the power source and movable in said other chamber in electrical contacting engagement with said resistor means for establishing the output voltage;

piston means engaged with said diaphragm means and movable in a part of said housing within said other chamber between a pair of opposite positions for actuating said voltage selector means in response to the fluid pressure of the source acting on said diaphragm means, said piston means including means for engagement with said housing part to define at least one of the opposite positions of said piston means; and resilient means for opposing movement of said piston means from the at least one opposite position toward the other of the opposite positions thereof, said resilient means including a generally circumferential section mounted in association with said housing, and a plurality of resilient fingers extending from said circumferential section into engagement with said piston means, respectively.

8. A transducer as set forth in claim 7 wherein said resistor means comprises a substrate mounted in said other chamber and having a resistance element interconnected between a pair of connection means adapted for connection in the circuit relation across the power source, respectively, said voltage selector means being in electrical contacting engagement with said resistance element.

9. A transducer as set forth in claim 7 wherein said voltage selector means comprises a conductive spring element pivotally arranged in said other chamber and having a free contact end movable in the electrical contacting engagement on said resistor means, said conductive spring element being actuated by said piston means.

10. A transducer as set forth in claim 7 wherein said resistor means comprises a substrate mounted in said other chamber and having a resistance element interconnected between a pair of connection means thereon and adapted for connection in the circuit relation across the power source, respectively, and said voltage selector means comprising a conductive spring element pivotally arranged in said other chamber and having a free contact end movable in the electrical contacting engagement with said resistance element between said connection means, said conductive spring element being pivotally actuated by said piston means.

11. A transducer adapted for connection in circuit relation with a power source and in pressure fluid communication with a source of fluid pressure to establish an output voltage proportional to an input fluid pressure supplied from the fluid pressure source, the transducer comprising:

a housing;

resistor means in said housing and adapted for connection in the circuit relation with the power source;

voltage selector means adapted for connection in the circuit relation with the power source and movable in said housing in electrical contacting engagement with said resistor means for establishing the output voltage;

means movable in said housing and adapted for subjection to the input fluid pressure supplied from the source thereof for effecting the movement of said voltage selector means;

at least one terminal means mounted to said housing and adapted for connection in the circuit relation with the power source, said at least one terminal means including an electrical connector section exteriorly of said housing, and a supporting arm integral with said electrical connector section and interiorly of said housing with said voltage selector means supported on said supporting arm; and adjusting means adjustably movable in said housing in engagement with said supporting arm of said at least one terminal and adapted for displacing said supporting arm and said voltage selector means supported thereon toward a calibration position in which said voltage selector means is in the electrical contacting engagement with said resistor means to effect a preselected minimum value of the output voltage with respect to a preselected minimum value of the input fluid pressure acting on said actuating means.

12. A transducer as set forth in claim 11 wherein said at least one terminal means further includes a free end portion on said supporting arm arranged adjacent said adjusting means in the engagement therewith and spaced from said resistor means, said voltage selector means being pivotally mounted to said free end portion of said supporting arm and extending therefrom into the electrical contacting engagement with said resistor means.

13. A transducer as set forth in claim 11 wherein said at least one terminal means further includes a deformable section, said deformable section being deformed when said supporting arm and voltage selector means is displaced to the calibration position thereof by said adjusting means.

14. A transducer as set forth in claim 11 further comprising a pair of terminal means mounted to said housing and adapted for connection in the circuit relation with the power source, said terminal means pair including a pair of supporting sections interiorly of said housing connected in circuit relation across said resistor means, respectively.

15. A transducer as set forth in claim 11 wherein said adjusting means comprises an adjusting screw threadedly received in said housing and arranged in the engagement with said supporting arm interiorly of said housing.

* * * * *